Dec. 13, 1966  S. A. STADLEN ET AL  3,291,638
HEAT RESISTANT COATING COMPOSITIONS AND METHOD
Filed Oct. 24, 1962
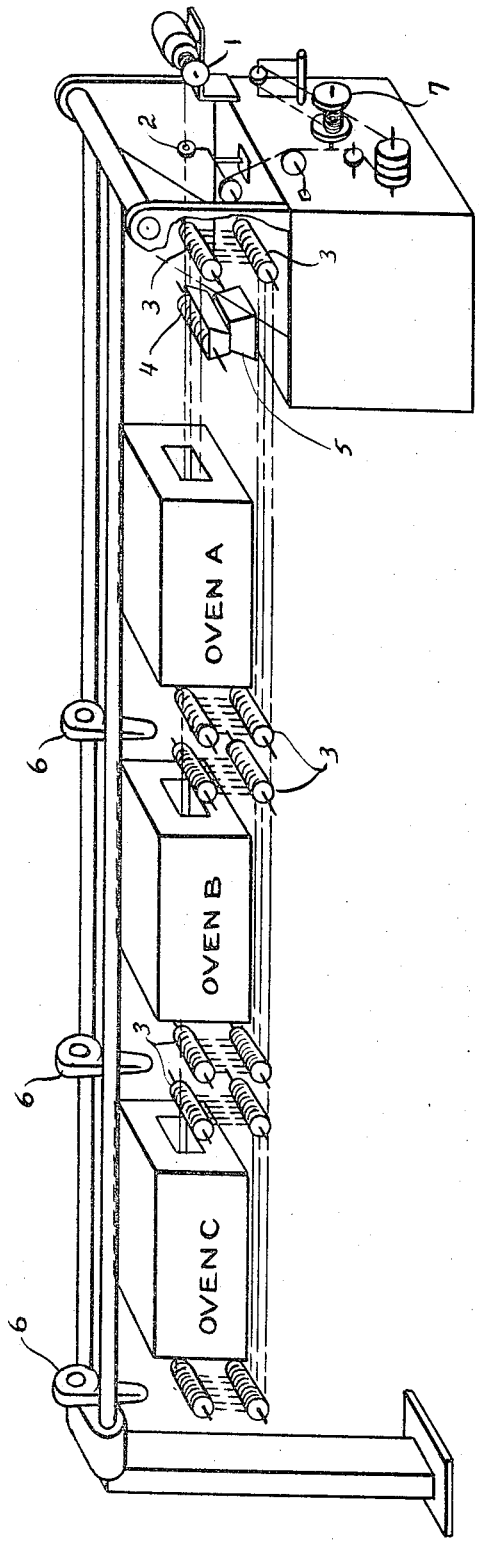
INVENTORS
STANLEY A. STADLEN
OTTAVIO RAPPOSELLI
BY
AT TORNEYS United States Patent Office 3,291,638
Patented Dec. 13, 1966

3,291,638
HEAT RESISTANT COATING COMPOSITIONS AND METHOD
Stanley A. Stadlen, North Woodmere, N.Y., and Ottavio Rapposelli, Jersey City, N.J., assignors to General Cable Corporation, New York, N.Y., a corporation of New Jersey
Filed Oct. 24, 1962, Ser. No. 233,502
8 Claims. (Cl. 117—231)

This invention relates to improved heat resistant, electrically insulating coating compositions which are easily applied to various conductor substrates, to a process for applying such compositions to various conductors, and to the resultant high temperature coated wire.

Many ceramic compositions and ceramic coated wires are currently available to the art. Many of the compositions are restricted in the substrate to which they may be applied. For example, several popular ceramic coatings can be applied only on oxidized nickel surfaces. The ceramic coated wires known to the art do not possess the desired well balanced properties and are poor in the characteristics of flexibility, adherence, or electrical continuity, or combinations thereof.

It is, therefore, an object of this invention to provide a coating composition which will provide a high temperature resistant coating having excellent flexibility, adherence and electrical continuity.

It is a further object of this invention to provide an improved high temperature coated wire having the desired characteristics of excellent adherence, flexibility, and electrical continuity and which is stabilized for the operating temperature of the application intended, and to the method of coating such wire.

In accordance with these objects there is provided, in a preferred embodiment of this invention, a coating composition consisting of aluminum oxide, frit, a film forming silicone resin, and a cross linking silicone resin. The resin system must be such as to dry to a tack-free film at a temperature sufficiently low to avoid flashing of the solvent. The cross linking of the resin system must effectively compress the coating material during cure, without developing cracks due to excessive cross linking.

The silicone vehicle is decomposed in the final stage of curing. Part of the silicone resin is volatilized at the completion of the coating operation, leaving some of the organic material, silica ($SiO_2$). Final curing will leave the silica in amorphous form to form an integral part of the high temperature coating with the added frit.

To apply the coating to wire, the wire is coated in successive passes and baked without flashing the solvent. After forming the wire into the desired coils or other configurations, the wire is baked at a higher temperature to cure the coating for the anticipated operating temperatures.

Having briefly described this invention, it will be described in greater detail in the following portions of the specification, which refer to the accompanying figure, constituting a perspective view of apparatus for coating and curing the coating.

The coating composition is formed by dispersing frit, such as aluminum oxide, in a silicone resin system.

Methyl phenyl silicone copolymers formed as co-condensation products of methyl and phenyl silicones, having similar molar proportions of methyl groups and phenyl groups and having a total R/Si ratio of about 1.8, have been found suitable for use, where R represents methyl and phenyl radicals.

Two commercially available resins, one the Dow Corning DC–805, a good film former, having an acid number less than 0.1, specific gravity at 25 C. of 1.06, a viscosity at 25 C. and 60% solids of 20 to 40 centipoises, and containing 15–25% phenyl groups with a similar concentration of methyl groups and practically no hydroxyl groups, and the other the Dow Corning DC–2105A, a good cross linking resin, having an acid number of 0.22, specific gravity at 25 C. of 1.06, a viscosity at 25 C. and 60% solids of 80 to 125 centipoises, and containing 15–25% by weight of phenyl groups, with a 1.5/1 and 10% by weight phenyl to methyl ratio of hydroxyl groups, constitute such a silicone resin system when blended in the proper proportions.

Ratios which have been found to give satisfactory coating lie between eight parts DC–805 to one part DC–2105A, and twelve parts DC–805 to one part DC–2105A. (This range might be extended by changing the processing equipment.) Ratios less than 8/1 result in formulations which develop brittle coatings and ratios greater than 12/1 produce formulations which develop coating which are tacky.

The physical state of the inorganic material before baking should be somewhat porous as compared to a dense material of the same type. For example, Alcoa alumina A–14 (porous) makes a better frit than Alcoa alumina A–10 (dense) with better dielectric continuity, all other factors being the same.

The resin solid to inorganic material ratio should be between 2/1 and 1/2. Formulations containing ratios in excess of 2/1 produce tacky coatings and those containing ratios less than 1/2 develop brittle coatings.

Particle size of the inorganic material should be at or below $2.0\mu$ and the size range should be as narrow as can be obtained using good pulverizing and milling technique.

The following formulations illustrate the invention but are not intended to limit it.

1 Formula 18–31–1:
  DC resin 805 (50% solids in xylene) ___g__ 400
  DC resin 2105A (50% solids in toluene) _g__  50
  Alcoa alumina A14 (—325 mesh) _____g__ 112.5
  Milling time 24 hrs. avg. particle size ____ $2.6\mu$ This combination produces a coating which when applied to wire and fully cured will withstand 500–600 C., will flex on a 7X mandrel without cracking, is resistant to the attack of toluene, naphtha and methanol (both solvent and vapor) and retains excellent continuity when tested by means of the mercury bath electrical continuity tester.

2 18–32–2:
  DC resin 805 (50% solids) _____g__ 500
  DC resin 2105A (50% solids) _____g__  50
  Alcoa A14 (—325 mesh) _____g__ 137.5
  Milling time, 40 hrs. avg. particle size _____ $2.0\mu$ This wire produced from this formulation is essentially like Formulation #1. Flexibility is slightly improved.

3 18–35–1:                                         G.
  Resin 805 (50% solids) _____  240
  Resin 2105A (50% solids) _____   20
  Alcoa A14 _____ 243.75

4 18-36-3:  G.
   Resin 805 (50% solids) _____ 320
   Resin 2105A (50% solids) _____ 40
   Alcoa A14 _____ 270
5 18-37-2:  G.
   DC Resin 805 (50% solids) _____ 20
   DC Resin 2105A (50% solids) _____ 20
   Alcoa A14 _____ 243.75

Formulations #4 and #5 produce wire with essentially the same characteristics, detailed in Table I.

The foregoing formulations have been successfully coated on conductors of copper, fine silver, silver plated copper, silver plated copper clad steel, nickel plated copper, nickel clad copper, chromium plated copper, stainless steel, stainless steel clad copper and aluminum. Selection of a suitable conductor is essential to the proper performance of the ultra-high temperature insulated wire. The wide variety of bare materials shown above, which are given to illustrate but not limit the conductor used, make possible selection of a conductor most appropriate for varied industrial and commercial requirements.

Table I gives typical test properties of wire insulated with our high temperature formulations. Similar properties are obtained using either fine silver wire or 28% nickel clad wire.

TABLE I.—TYPICAL TEST PROPERTIES

*(1) Physical properties*

Size, AWG _____ #30.
Conductor _____ Nickel clad (28%) copper wire.
Insulation _____ Ceramic.
Outside diameter, inches _ 0.0108.
Bare wire, inches _____ 0.0100.
Addition, inches _____ 0.0008.
Fexibility _____ Passes 5X mandrel.
Adherence _____ Passes snap test.
Heat Shock:
  24 hours at 200 C. __ Passes 8X mandrel for all conditions listed.
  24 hours at 300 C. __ Passes 8X mandrel for all conditions listed.
  24 hours at 400 C. __ Passes 8X mandrel for all conditions listed.
  24 hours at 500 C. __ Passes 8X mandrel for all conditions listed.

*(2) Chemical properties*

NEMA chemical tests:
  Petroleum naphtha _____
  Commercial grade 3 deg. toluol _____
  Denatured ethyl alcohol ____
  5% sulphuric acid _____
  1% potassium hydroxide ___
    Passes solubility test, 24 hrs. room temperature, immersion in specified liquids.

| Moisture Resistance Exposure Time at 96% Relative Humidity, Hrs. | Weight Gain, Percent | Based on film weight |
|---|---|---|
| | Original Sample | Sample Previously Baked 40 Hours at 500 C. |
| 96 | 0.00 | 0.18 |
| 168 | 0.00 | 0.35 |
| 336 | 0.00 | 0.35 |

*(3) Electrical properties*

Dielectric strength, volts
  (NEMA twisted pair specimens used):
    Original _____ 300–400
    After 96 hours at 96% R.H. _____ 300–400

Readings taken at room temperature after 24 hours aging:
  At 200 C. _____ 200
  At 300 C. _____ 150
  At 400 C. _____ 150
  At 500 C. _____ 150

Readings taken at room temperature after aging for 168 hours:
  At 400 C. _____ 300–400
  At 500 C. _____ 300–400

| Insulation Resistance, Megohms (Twist specimens used, 34 inches long bent into "U" shape, in air) | (Type 544-B Megohm Bridge) (General Radio Corporation) |
|---|---|
| Readings taken at test temperature: | |
| 25 C | $110 \times 10^4$ |
| 50 C | $110 \times 10^4$ |
| 100 C | $110 \times 10^4$ |
| 200 C | $115 \times 10^3$ |
| 300 C | $16.6 \times 10^3$ |
| 400 C (after 33 days aging) | $3.5 \times 10^2$ |
| 500 C | $6.2 \times 10$ |
| 600 C | $6.4 \times 10$ |

Insulation resistance at room temperature after 33 days at 400 C.—$22 \times 10^3$.

Insulation resistance at room temperature after 2 days at 600 C.—$13 \times 10^3$.

Continuity NEMA mercury bath—Excellent.

The coating formulations described will produce a good quality ultra-high temperature wire when applied and processed using a suitable method. The figure illustrates an apparatus used to apply the formulation in accordance with this invention. The wire travels from the payoff spindle 1 through solvent cleansing wipes 2 over guide sheaves 3 and then over the top grooves of a variable speed driven porcelain roller 4 which is rotated in the same direction that the wire is travelling. The roller is partially immersed in the suspension of coating material and delivers a constant quantity of the suspension to the wire. To obtain a uniform coating, it is vital that the solids in suspension stay properly distributed in the vehicle. This is accomplished by a continuous constant vigorous stirring carried out by the magnetic stirring device built into the applicator 5. Another essential for producing good quality wire is adequate cooling of the wires as they come out of the ovens to avoid adherence of the coating to the guide sheaves, and in the case of the wires leaving Oven A, to also insure that the wire is sufficiently cooled to avoid flashing of the solvent on succeeding passes. For this purpose, the natural cooling to which the wire is subjected by exposure to ambient room conditions, is supplemented by cooling boxes 6 which blow a continuous stream of air on the wires after they leave the ovens.

Following the application of the first coat, the wire travels through Oven A and returns to the applicator for additional coatings, each coating being followed by an additional pass through Oven A permitting a suitable number of coatings to be applied. Following the last pass through Oven A, the wire makes a series of multiple passes in tandem through Oven B and finally through Oven C, after which the wire is collected on the takeup spindle 7.

Typical processing conditions using the coating machine described, employ oven temperatures ranging from 400 to 1000 C., wire speeds from 10 to 30 ft./minute with ceramic suspension viscosities of 10 to 20 centipoises and 25 to 45% solids content.

Typical sets of running conditions are listed below for illustration.

EXAMPLE I

Wire—No. 26 AWG Nickel clad (28%) copper, silver or stainless steel clad (28%) copper conductor.
Speed—12 ft./minute
Viscosity of coating material—10 cps.
Oven temperatures:
    No. 1—560 C.
    No. 2—590 C.
    No. 3—600 C.
No. of passes—10
Wire Sequence—Individual line passes through ovens A and B before each repeated coating application.

EXAMPLE II

Wire—No. 40 AWG Nickel clad (28%) copper, silver or stainless steel clad (28%) copper conductor.
Speed—26 ft./minute
Viscosity of coating material—10 cps.
Oven temperatures:
    No. 1—450 C.
    No. 2—525 C.
    No. 3—600 C.
No. of passes—10
Wire Sequence——Series of ten passes completed in sequence; first Oven No. A, then in tandem Oven B followed by Oven C.

The nature of the coating machine used, having three separate ovens capable of completely independent temperature control, spacing from one another and combinations of various sequences of multiplicity of passes permits suitable development of basic coated wire properties.

The multiple pass arrangement through Oven A permits a controlled coating build up of the coating by removal of the solvent and part of the DC 805 resin between passes, with retention of the balance of the silicone resins. The series of passes through Oven B followed by the series of passes through Oven C removes in sequence, the more volatile silicone resin constituents at the same time that the cross linking of the DC 2105A resin exerts a compressing effect on the individual layers. The finished wire contains residual organic constituents of the silicone resins which can be removed by the firing of the wire after it has been fabricated into the desired components. Complete removal of residual organic constituents of the silicone resins is effected by firing in air for two hours at 600 C. or for twelve hours at 500 C., leaving only the $Al_2O_3$ and $SiO_2$.

We have found that it is not always necessary to fire the fabricated components under the foregoing conditions. The post processing of the wire can be varied depending upon the expected application and operating conditions.

For example, for 300 C. continuous operation in air the coated wire can be stabilized by baking in air for about thirty minutes at 400 C. or higher or for about forty hours at 300 C. After such bakeout the wire can be continuously operated at 300 C. without danger of any outgassing. For continuous operation in air at 400 C. stability can be achieved by baking in air for about thirty minutes at 500 C. or higher, or for about forty hours at 400 C.

For continuous operation in air at 500 C. or higher, the firing already described, two hours at 600 C. or twelve hours at 500 C. completely stabilizes the wire. Firing at higher temperatures such as 700 C., 800 C. or 900 C. achieve results similar to the 600 C. firing.

We have also determined that for high temperature operations in inert or inactive (gas) atmospheres the coated wire exhibits complete stability without the need for prior bakeout or firing.

It is necessary for a suitable conductor material to be used to utilize the complete thermal capability of a coating. Nickel clad (28% by weight) copper such as the Sylvania "Kulgrid 28" permits satisfactory usage of the coated wire to about 550 C. Stainless steel clad (28% by weight) copper wire such as the Sylvania "Oxalloy 28" extends the satisfactory operating range to 700 C.

Normal wire coating operations require complete baking or curing of each individual wire pass usually in one continuous oven before additional coating material is applied in subsequent passes. This usual coating procedure could not be used for our ceramic formulation and would not produce good quality wire having the general properties shown in Table I with our ceramic formulations.

This invention may be variously modified and embodied within the scope of the subjoined claims.

What is claimed is:

1. An electrically insulating wire coating composition which, after curing, is resistant to high temperatures comprising from eight to twelve parts of a film forming methyl phenyl silicone resin to one part of a cross linking methyl phenyl silicone resin, and an inorganic frit, the ratio of resin solids to inorganic frit being in the range 2/1 to 1/2, said film-forming resin having a specific gravity at 25 C. of approximately 1.06, a viscosity at 25 C. and 60% solids of approximately 20 to 40 centipoises, and containing approximately 15% to 25% phenyl groups with a similar concentration of methyl groups and practicaly no hydroxyl groups, and said cross-linking resin having a specific gravity at 25 C. of approximately 1.06, a viscosity at 25 C. and 60% solids of approximately 80 to 125 centipoises, and containing approximately 15% to 25% phenyl groups and 10% of hydroxyl groups.

2. An electrically insulating wire coating resistant to high temperature after curing, said coating including from 8 to 12 parts of a film-forming methyl phenyl silicone resin, one part of a cross-linking methyl phenyl silicone resin, and an inorganic frit, the ratio of resin solids to frit being in the ranges 2/1 to 1/2 and the coating being a co-condensation product of a film-forming methyl phenyl silicone resin having 15–25% by weight of phenyl groups with a similar concentration of methyl groups and practically no hydroxyl groups, and having a total R/Si ratio of about 1.8, an acid number less than 0.1, specific gravity at 25 C. of 1.06, and viscosity at 25 C. and 60% solids of 20 to 40 centipoises, with a cross-linking methyl phenyl silicone resin containing hydroxyl groups.

3. A coating composition in accordance with claim 2 in which said cross linking resin comprises a methyl phenyl silicone resin having 15–25% by weight of phenyl groups with a 1.5/1 phenyl to methyl ratio and 10% by weight of hydroxyl groups, and having a total R/Si ratio of about 1.8, an acid number of 0.22, specific gravity at 25 C. of 1.06, and a viscosity of 25 C. and 60% solids of 80 to 125 centipoises.

4. A coating composition in accordance with claim 2 in which said frit comprises amorphous alumina.

5. The method of preparing coated wire which comprises the steps of repeatedly coating the wire with the composition of claim 1, heating the wire after each coating is applied to render the coating non-adherent without flashing the solvent, cooling the heated wire before the next coating is applied, and then in a series of successive heating and cooling steps gradually evaporating the residual solvent and then subjecting the coated wire to a final firing step to remove the more volatile decomposition products of the resins.

6. The product obtained by the process of claim 5.

7. The method according to claim 5 in which there is a series of successive heating steps at one temperature, followed by a series of successive heating steps at a higher temperature.

8. The method according to claim 7 in which the final firing step is at a temperature at least equal to the anticipated operating temperature and continues until the coating is stabilized.

References Cited by the Examiner

UNITED STATES PATENTS

| | | | |
|---|---|---|---|
| 2,645,588 | 7/1953 | Barry | 260—37 |
| 2,984,590 | 5/1961 | Anderson | 117—232 |
| 3,089,787 | 5/1963 | Sattler et al. | 117—232 |
| 3,093,511 | 6/1963 | Weisel et al. | 117—232 |

RALPH S. KENDALL, *Primary Examiner.*

RICHARD D. NEVIUS, ALFRED L. LEAVITT, *Examiners.*

W. L. JARVIS, *Assistant Examiner.*